US008176464B2

(12) United States Patent
Ponnath

(10) Patent No.: US 8,176,464 B2
(45) Date of Patent: May 8, 2012

(54) METHOD AND FRAMEWORK FOR SECURING A SOURCE CODE BASE

(75) Inventor: Maneesh Kumar Ponnath, Bangalore (IN)

(73) Assignee: Infosys Technologies Limited (IN)

( * ) Notice: Subject to any disclaimer, the term of this patent is extended or adjusted under 35 U.S.C. 154(b) by 805 days.

(21) Appl. No.: 12/317,708

(22) Filed: Dec. 23, 2008

(65) Prior Publication Data

US 2009/0183137 A1   Jul. 16, 2009

(30) Foreign Application Priority Data

Dec. 24, 2007   (IN) .......................... 3079/CHE/2007

(51) Int. Cl.
*G06F 9/44* (2006.01)
*G06F 11/00* (2006.01)
*G06F 3/00* (2006.01)

(52) U.S. Cl. ........................... 717/101; 714/10; 719/328

(58) Field of Classification Search ................... 717/101
See application file for complete search history.

(56) References Cited

U.S. PATENT DOCUMENTS

| | | | |
|---|---|---|---|
| 6,502,102 B1 * | 12/2002 | Haswell et al. ............ | 1/1 |
| 6,519,571 B1 * | 2/2003 | Guheen et al. ............ | 705/14.66 |
| 6,609,128 B1 * | 8/2003 | Underwood .............. | 707/610 |
| 7,100,195 B1 * | 8/2006 | Underwood .............. | 726/2 |
| 7,467,198 B2 * | 12/2008 | Goodman et al. ........ | 709/223 |
| 7,886,148 B2 * | 2/2011 | Kiriansky et al. ........ | 713/166 |
| 2003/0182652 A1 * | 9/2003 | Custodio ................. | 717/122 |
| 2005/0193269 A1 * | 9/2005 | Haswell et al. .......... | 714/38 |
| 2006/0206882 A1 * | 9/2006 | Illowsky et al. ......... | 717/144 |
| 2007/0006152 A1 * | 1/2007 | Ahmed et al. ........... | 717/122 |
| 2007/0157156 A1 * | 7/2007 | Meier et al. ............. | 717/101 |
| 2007/0240138 A1 * | 10/2007 | Chess et al. ............. | 717/143 |
| 2008/0263505 A1 * | 10/2008 | StClair et al. ........... | 717/101 |
| 2010/0011209 A1 * | 1/2010 | Kiriansky et al. ........ | 713/166 |

* cited by examiner

*Primary Examiner* — John E Breene
*Assistant Examiner* — Mohammad Kabir
(74) *Attorney, Agent, or Firm* — Lerner, David, Littenberg, Krumholz & Mentlik, LLP

(57) ABSTRACT

A framework for securing a source code base during the development phase of a software development lifecycle is provided. The framework includes an aspect package module and a validator package module. The aspect package module integrates security routines into the source code base. The aspect package module includes a custom interface module and a validator aspect module. The custom interface module includes a function declaration, wherein the custom interface module is implemented by at least one class of the one or more classes. The validator aspect module includes a controller code for controlling the flow of the execution, based on the context for the security validation of the at least one class, wherein one or more security routine integration points are defined in the at least one class. The validator package module validates the at least one class, based on the defined context, by using one or more validation classes.

23 Claims, 9 Drawing Sheets

METHOD AND FRAMEWORK FOR SECURING A SOURCE CODE BASE

BACKGROUND OF THE INVENTION

The invention relates generally to the software development lifecycle. More specifically, the invention relates to a framework and a method for securing a source code base during the development phase of the software development life cycle The software development life cycle includes conceptualization, a cost-benefit analysis, and detailed specifications of software requirements, design, programming, testing and maintenance. For a software program to be robust, inputs to it need to be validated to safeguard against input injection errors. Standard input validation mechanisms are used to validate the input data for its length, type, syntax and business rules before accepting the data that is to be displayed or stored. For example, a field for the entry of telephone numbers should only include digits and/or a plus/minus sign. An invalid entry/input may result in the software program becoming vulnerable. Robustness is achieved by building security routines for the source code base. Security routines help in developing a secure code. For example, the Web Application Firewall (WAF) is a server application that intercepts HTTP traffic, to check inputs into the application layer. Custom Security Routines are also used to prevent input rejection related security attacks. Similarly, Servlet filters, introduced in Java Servlet 2.3, validate HTTP request parameters to check for malicious inputs that can potentially exploit the vulnerability of an application layer.

However, some of these validation techniques are not incorporated during the development phase of the software development lifecycle currently. Further, some of these techniques are not adjustable and are not based on context-sensitive information. Context-sensitive information includes additional information related to the characteristics and behavior of the code being executed, and enables optimal usage of the security routine. Hence, in some of these validation techniques, each of the security routines is applied to each of the variables making a request for security validation. This may affect the performance of the software program.

In some of these techniques, security routines are tightly coupled with specific applications, and hence, are not flexible. Further, the creation of these security routines requires considerable expertise in programming.

In light of the foregoing, there is a need for a context-based validation framework that incorporates input validation-related security features into the software development life cycle. Further, the framework needs to be extensible, such that the validation rules can be updated without modifying the underlying source code base.

BRIEF SUMMARY OF THE INVENTION

An object of the invention is to provide a framework for securing a source code base.

Another object of the invention is to provide a framework for integrating the security features into the source code base without modifying the underlying source code base.

Yet another object of the invention is to provide a context-based framework for input validation-related security features in a software development lifecycle.

To achieve the objectives mentioned above, the invention provides a framework for securing a source code base during the development phase of a software development lifecycle. The source code base includes one or more classes. The framework includes an aspect package module and a validator package module. The aspect package module integrates one or more security routines into the source code base. The aspect package module includes a custom interface module and a validator aspect module. The custom interface module includes a function declaration. To define one or more security integration points within the one or more classes, an empty function, corresponding to the function declaration, is called. The validator aspect module includes a controller code for controlling the flow of execution, based on the context for the security validation of the at least one class. The context includes the names of the one or more security routines to be applied for security validation and the names of the functions that invoke the one or more security routines for security validation. The validator package module validates the at least one class, based on the defined context, using one or more validation classes.

The framework therefore provides context-based security validation. Further, the framework integrates the security features into the source code base without modifying the underlying source code base. Therefore, the programmer need not be a security expert to integrate the security features into the source code base.

If a new input injection-related vulnerability is identified, the framework can be updated with the new security routines related to the vulnerability. Furthermore, the validator package module includes a rules database that can be modified to minimize false positives and false negatives. The security routines can be replaced with third-party security routines. Each of the above updates mentioned above are implemented without modifying the underlying source code base.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION

The invention provides a framework, a method and a computer program product for securing a source code base during the development phase of the software product life cycle. The invention includes a framework that is integrated into the source code base, which includes one or more classes. One or more security routines are integrated into the source code base, based on the one or more integration points. To define one or more security integration points in the one or more classes, an empty function that corresponds to a function declaration is called. The flow of the execution is based on the context for the security validation of at least one class of the one or more classes.

The context includes the names of the one or more security routines to be applied for security validation, the names of the functions that require security validation, and the names of the variables that require security validation. The at least one class is validated, based on the defined context, using one or more validation classes. The framework provides context-based input validation, based on a rules database.

Figure 1:
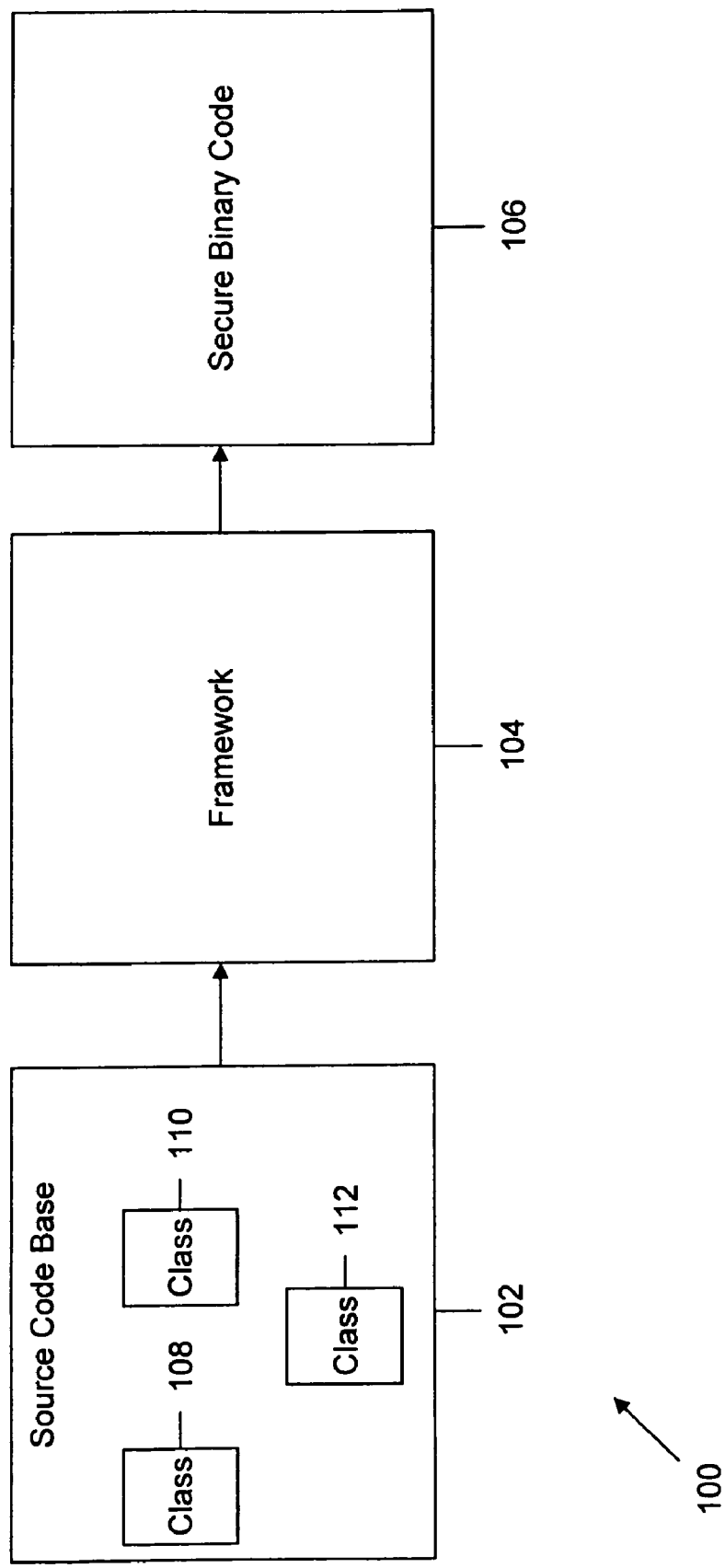
FIG. 1 is a block diagram of an environment in which various embodiments of the invention can be practiced.

FIG. 1 is a block diagram of an environment 100 in which various embodiments of the invention can be practiced. Environment 100 includes a Source Code Base 102, a Framework 104, and a Secure Binary Code 106.

Framework 104 includes security routines, based on the validation rules. Framework 104 is integrated into Source Code Base 102, based on one or more integration points defined by the programmer in Source Code Base 102. The integration of Framework 104 results in Secure Binary Code 106. Thereafter, Secure Binary Code 106 can be deployed as an application for usage. Framework 104 is described in detail in conjunction with FIG. 2, FIG. 3, and FIG. 4.

Source Code Base 102 is a computer program that is written in a programming language. Examples of programming languages include, but are not limited to, Java, C++, and the like. Source Code Base 102 includes one or more classes. In accordance with this embodiment, Source Code Base 102 includes one or more classes such as Class 108, Class 110, Class 112, and so forth.

In accordance with an embodiment, at least one class of the one or more classes includes one or more variables. These one or more variables are global in scope. One or more input values are assigned to each of the one or more variables. The input values require input injection related security validation. One or more integration points are thereby specified in the at least one class, to validate one or more variables. Security validation is provided, based on the one or more integration points.

Figure 2:
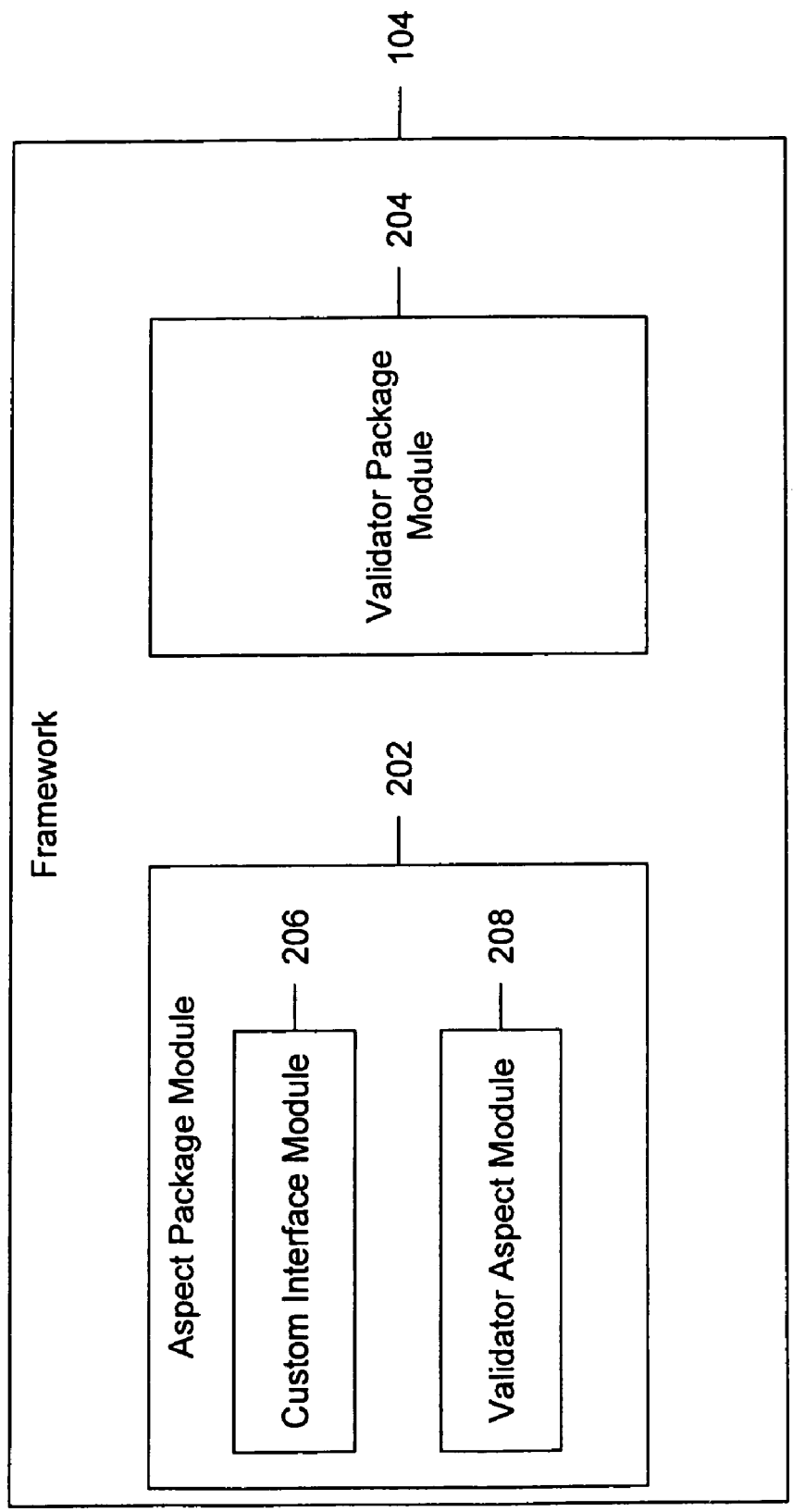
FIG. 2 is a block diagram of a Framework for securing the source code base, in accordance with an embodiment of the invention.

FIG. 2 is a block diagram of Framework 104 for securing Source Code Base 102, in accordance with an embodiment of the invention. Framework 104 includes an Aspect Package Module 202 and a Validator Package Module 204. Aspect Package Module 202 includes a Custom Interface Module 206 and a Validator Aspect Module 208.

Aspect Package Module 202 includes a security aspect that is applied according to the integration points specified by the programmer. The security aspect can be programmed in an Aspect Oriented Programming language (AOP). The security aspect includes a program code for integrating one or more security routines into Source Code Base 102.

Aspect Package Module 202 invokes security validation routines that are applied to the one or more variables in the one or more classes. Custom Interface Module 206 is implemented by the one or more classes that require security validation. The details of Custom Interface Module 206 are described in conjunction with FIG. 4. Validator Aspect Module 208 includes a controller code, which includes logic for controlling the flow of the execution, based on the defined context. Controlling the flow includes the order in which the one or more security routines are invoked based on the context information. Further, controlling the flow of the execution is based on the context for security validation of the one or more classes. When Source Code Base 102 is compiled, Validator Aspect Module 208 directs the flow of the execution according to the integration points defined in each of the one or more classes to a Validator Package Module 204. Validator Package Module 204 includes one or more validation classes. The one or more validation classes validate the input values of the one or more variables in the one or more classes, such as class 108. Validation of the input values ensures that only allowable characters are input into each of the one or more variables. For example, 'A12' is not an allowable input for a variable declared to be of the 'integer' type. Further, validation ensures that an incorrect input is filtered out before being processed.

Figure 3:
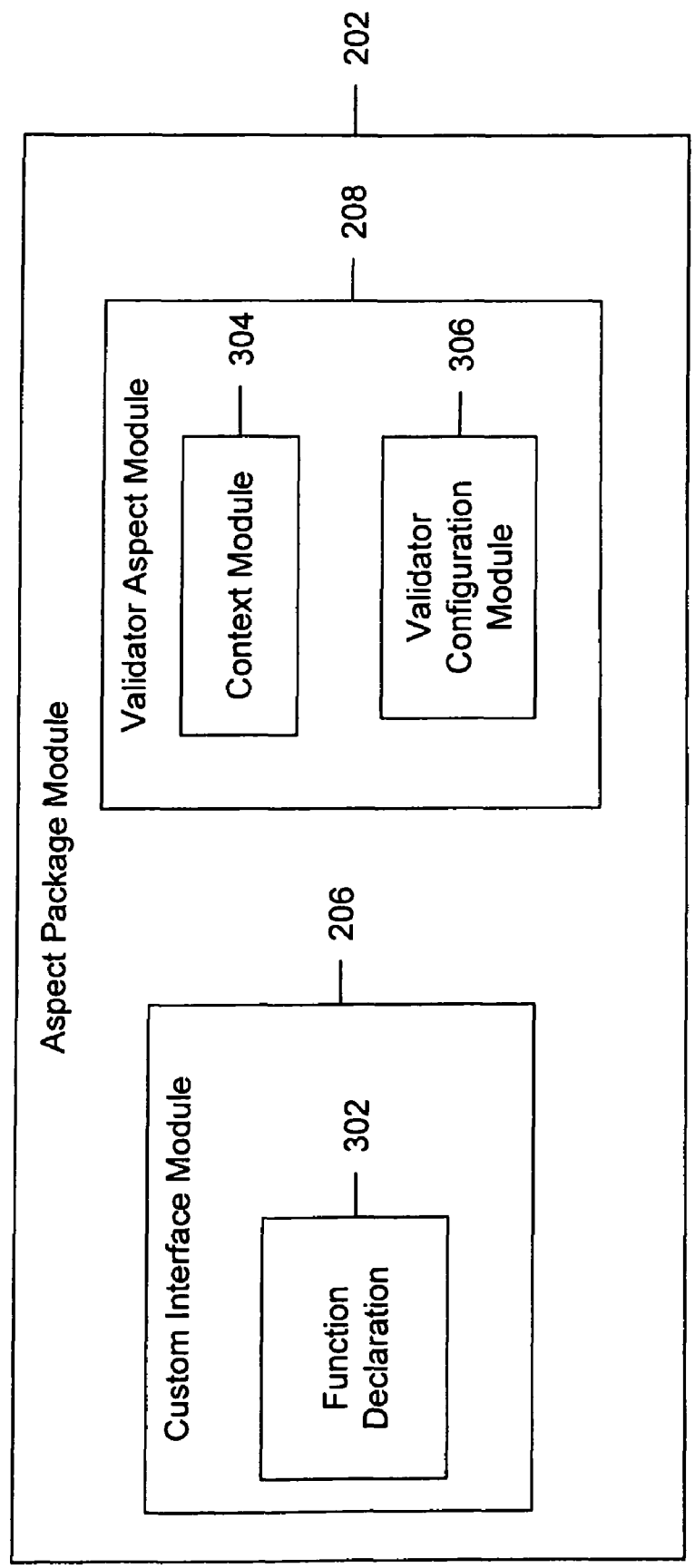
FIG. 3 is a block diagram of an Aspect Package Module, in accordance with an embodiment of the invention.

FIG. 3 is a block diagram of Aspect Package Module 202, in accordance with an embodiment of the invention. Aspect Package Module 202 includes Custom Interface Module 206 and Validator Aspect Module 208. Custom Interface Module 206 includes a Function Declaration 302. Validator Aspect Module 208 includes a Context Module 304 and a Validator Configuration Module 306.

Function Declaration 302 is used to define the one or more integration points within the one or more classes that require security validation. In an embodiment of the present invention, the one or more integration points are defined by calling an empty function for Function Declaration 302. Context Module 304 includes context information of one or more variables of at least one class of the one or more classes. This context information includes the names of one or more types of security routines that are to be applied for security validation for each of the one or more variables. For example, the SQL injection security routine is applied for SQL injection-related input security attacks. Further, the context information includes the names of functions that invoke the one or more security routines for security validation. For example, in the program code below, Class A implements Custom Interface Module 206. Class A defines Function Declaration 302, such as 'validate( )' A function that corresponds to 'validate( )', such as 'execute( )', is called before sending the user input to a validation class, such as 'applyBusinessRules( )', for processing. The function, 'execute( )', invokes the security routines that are to be applied to a variable, such as 'this.x', which contains the user input.

```
Public Class A implements CustomInterface
{
String x;
public void execute(String userinput)
{
this.x = userinput;
validate( );
BusinessValidator.applyBusinessRules(x);
}
public void validate( )
{
}
}
```

Validator Configuration Module 306 includes information relating to one or more validation classes. Each of the one or more validation classes performs a specific type of validation. For example, to perform SQL injection validation the validation class <Validator name="SQLInjection" class="com.infosys.wave.validator.SqlInjection"/> can be used.

In one embodiment, Validator Configuration Module 306 can be updated to replace existing validation classes. Further, new validation classes may be added to Validation Configuration Module 306. For example, new validation classes can be added based on the detection of the vulnerability related to the input injection-related security attacks. Updating of Validator Configuration Module 306 provides extensibility to Framework 104.

Context Module 304 and Validator Configuration Module 306 are updated without modifying Source Code Base 102. Thus, Source Code Base 102 uses the services of newly defined validation classes without modifying Source Code Base 102. Further, updating of Context Module 304 and Validator Configuration Module 306 reduces false positives and negatives during validation. False positives are minimized by fine tuning the validation rules and also by eliminating redundant validation classes for the one or more variables in the at least one class. False negatives are minimized by adding additional validation classes for one or more variables in the at least one class and also by fine tuning the validation rules.

Validation classes are called when the control reaches the empty function corresponding to Function Declaration 302 through the aspect integrated into Secure Code Base 102. Aspect integration involves embedding a program code in the aspect at the one or more integration points.

When the control reaches Aspect Package Module 202, the context information relating to the one or more variables is retrieved from Context Module 304. Thereafter, the assigned values of the one or more variables are extracted. Subsequently, each of the one or more variables is subjected to relevant security validation, based on the context information in Context Module 304. Security validation is performed by using the one or more validation classes. These one or more validation classes perform security validation by using one or more validation rules that are contained in each of the one or more validation classes.

Figure 4:
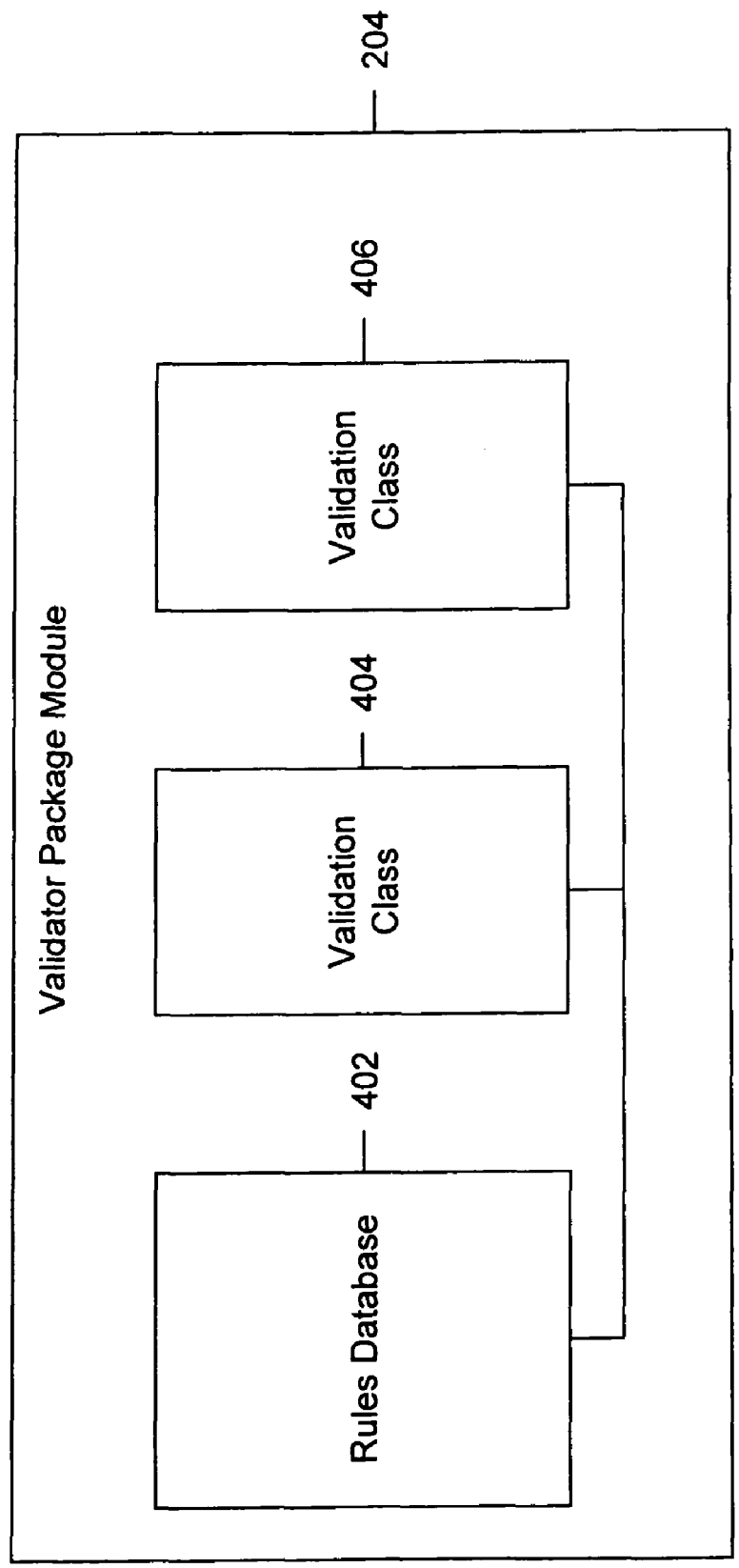
FIG. 4 is a block diagram of a Validator Package Module, in accordance with an embodiment of the invention.

FIG. 4 is a block diagram of a Validator Package Module 204, in accordance with an embodiment of the invention. Validator Package Module 204 includes a Rules Database 402, a Validation Class 404, and a Validation Class 406. Rules Database 402 includes the one or more validation rules used for performing security validation. Validation rules are regular expressions that define the grammar of valid/invalid data. The following is an xml snapshot of a validation rule for an SQL injection-related error:

```
- <vulnerability name="SQLInjection">
    <pattern name="key_words" false_positive="LOW"
    description="Key words found in the string,"
    value="(?i)((.)*((\;|\'|\-\-
    |\;)+(\s)*(\n)*)+(add|alter|bulk|and|or|between|begi
    n|both|call|close|commit|declare|delete|describe|dro
    p|else|end|execute|except|for|file|group|having|inse
    rt|if|in|like|load|open|proc|select|set|union|update
    |where|while)(.)*)"
    />
</vulnerability>
```

The one or more validation classes, such as Validation Class 404 and Validation Class 406, use Rules Database 402 to perform security validation for one or more variables.

Figure 5:
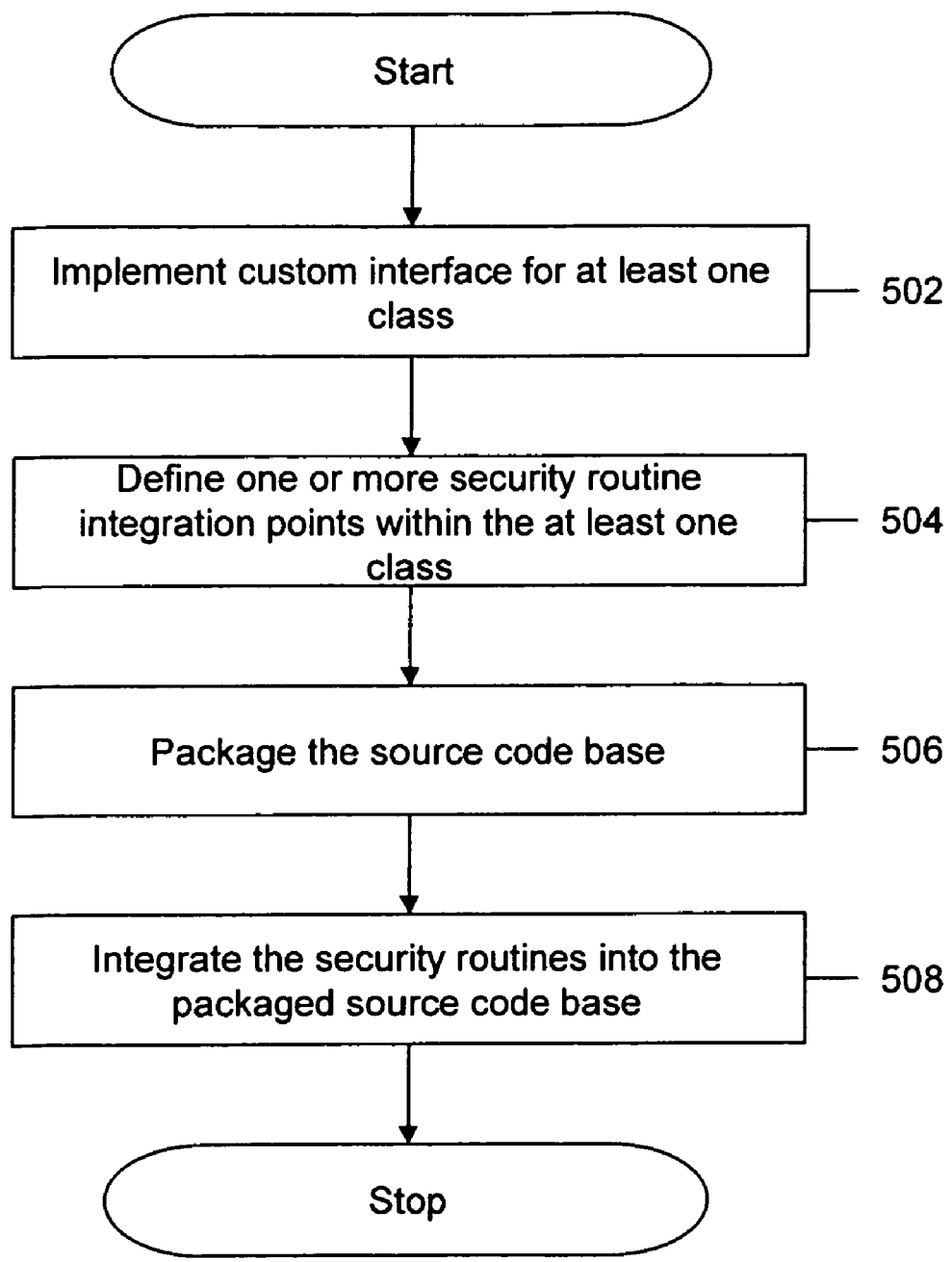
FIG. 5 is a flowchart illustrating a method for securing a source code base during the development phase of a software development lifecycle, in accordance with an embodiment of the invention.

FIG. 5 is a flowchart illustrating a method for securing a source code base, such as Source Code Base 102, during the development phase of a software development lifecycle, in accordance with an embodiment of the invention. The source code base includes one or more classes. At least one class of the one or more classes requires security validation, which is provided by using a framework such as Framework 104. The framework includes a custom interface such as Custom Interface Module 206. The custom interface includes a function declaration such as Function Declaration 302. At step 502, the custom interface is implemented for the at least one class of the one or more classes in the source code base. Thereafter, at step 504, one or more security routine integration points are defined within the at least one class. The one or more security routine integration points are defined for one or more variables in the class. The integration points are the points where security validation routines are applied within the at least one class during integration of the framework within the source code base. The details of defining integration points are described in conjunction with description of FIG. 8. After defining the integration points, the source code base is packaged at step 506. Subsequently, at step 508, one or more security routines are integrated in the packaged source code base. The details of the integration of the one or more security routines in the packaged source code base are explained in conjunction with the description of FIG. 8.

Figure 6A:
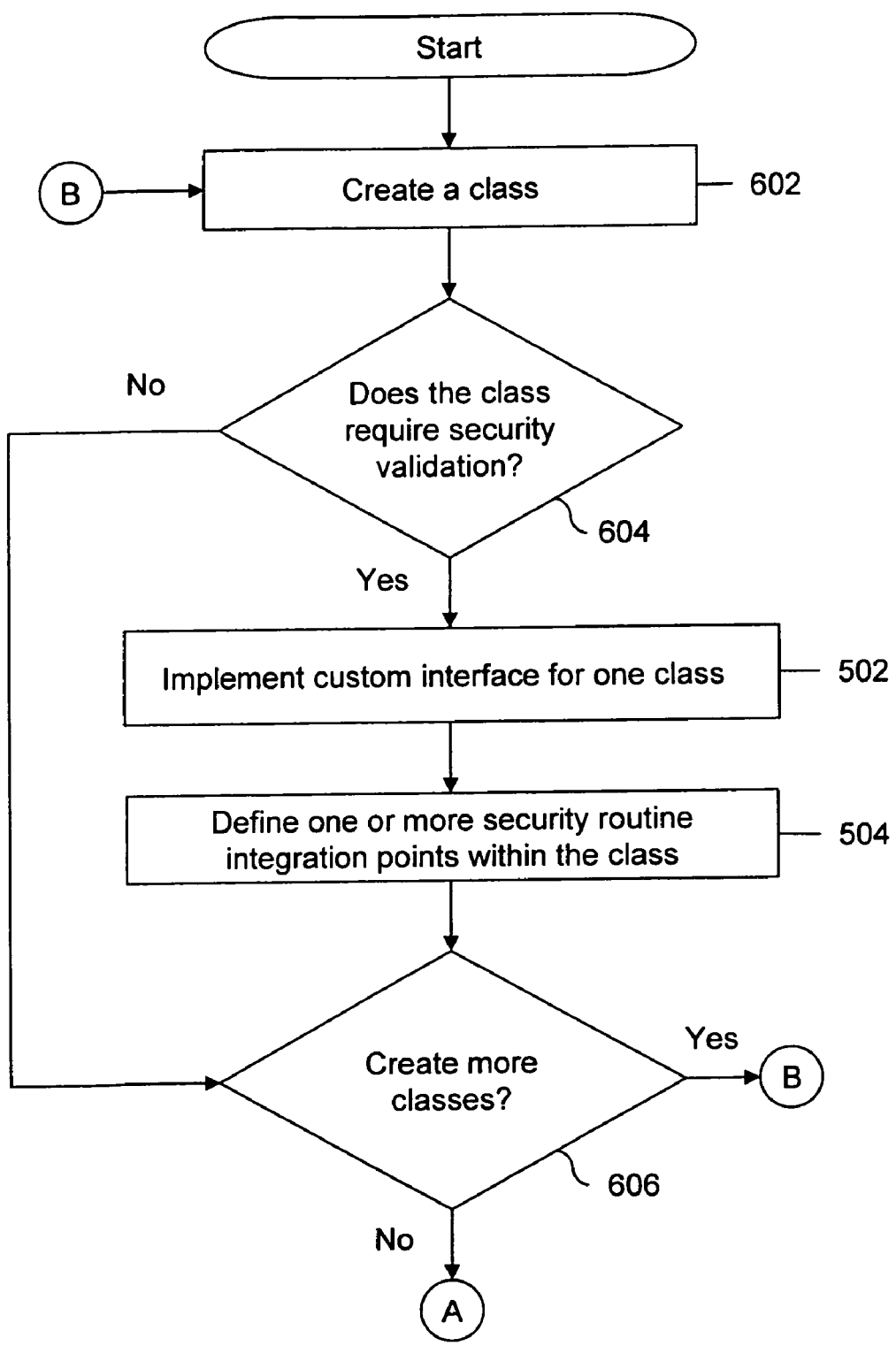
FIGS. 6*a* and 6*b* is a flowchart illustrating a method for securing a source code base during the development phase of a software development lifecycle, in accordance with another embodiment of the invention.
Figure 6B:
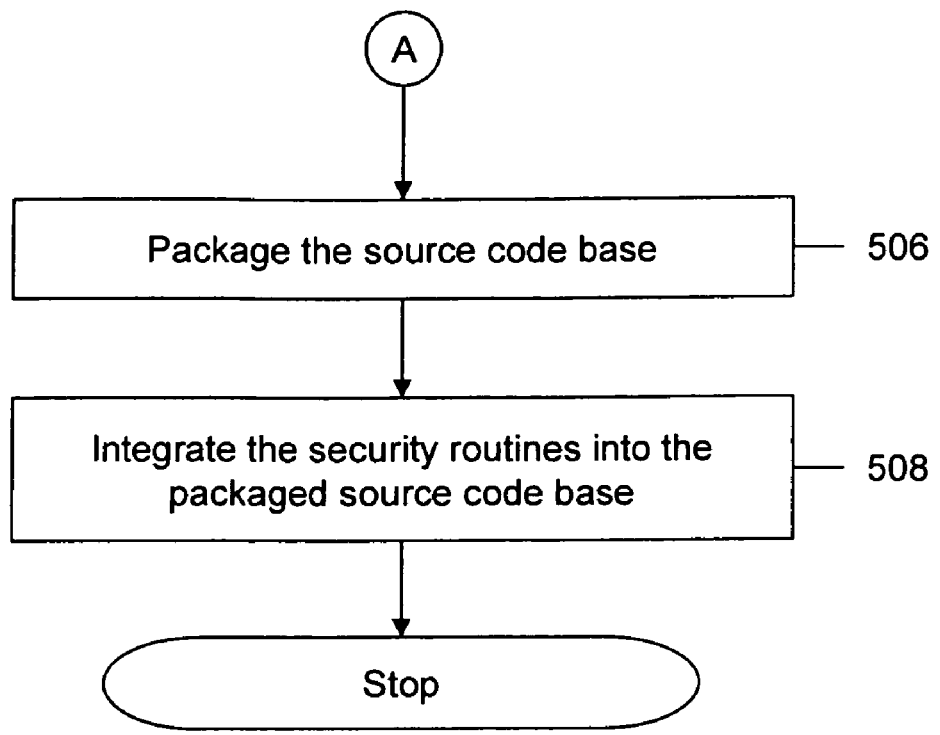

FIGS. 6a and 6b is a flowchart illustrating another method for a programmer securing the source code base during the development phase of a software development lifecycle, in accordance with another embodiment of the invention. At step 602, a class is created by the programmer. According to the embodiment, it is determined at step 604 whether the at least one class requires security validation for one or more variables in the at least one class. If the at least one class requires security validation, steps 502 and 504 are performed. At step 502, the custom interface is implemented for the at least one class of the one or more classes in a source code base such as Source Code Base 102. Thereafter, at step 504, one or more security routine integration points are defined within the at least one class. If the at least one class does not require security validation, it is determined at step 606 whether more classes need to be created by the programmer. If more classes need to be created, steps 602 to 606 are repeated. If no classes need to be created, steps 506 and 508 are performed. At step 506, the source code base is packaged. At step 508, the one or more security routines are integrated into the packaged Source Code Base 102 source code. The details of steps 506 and 508 are described in conjunction with FIG. 5.

Figure 7:
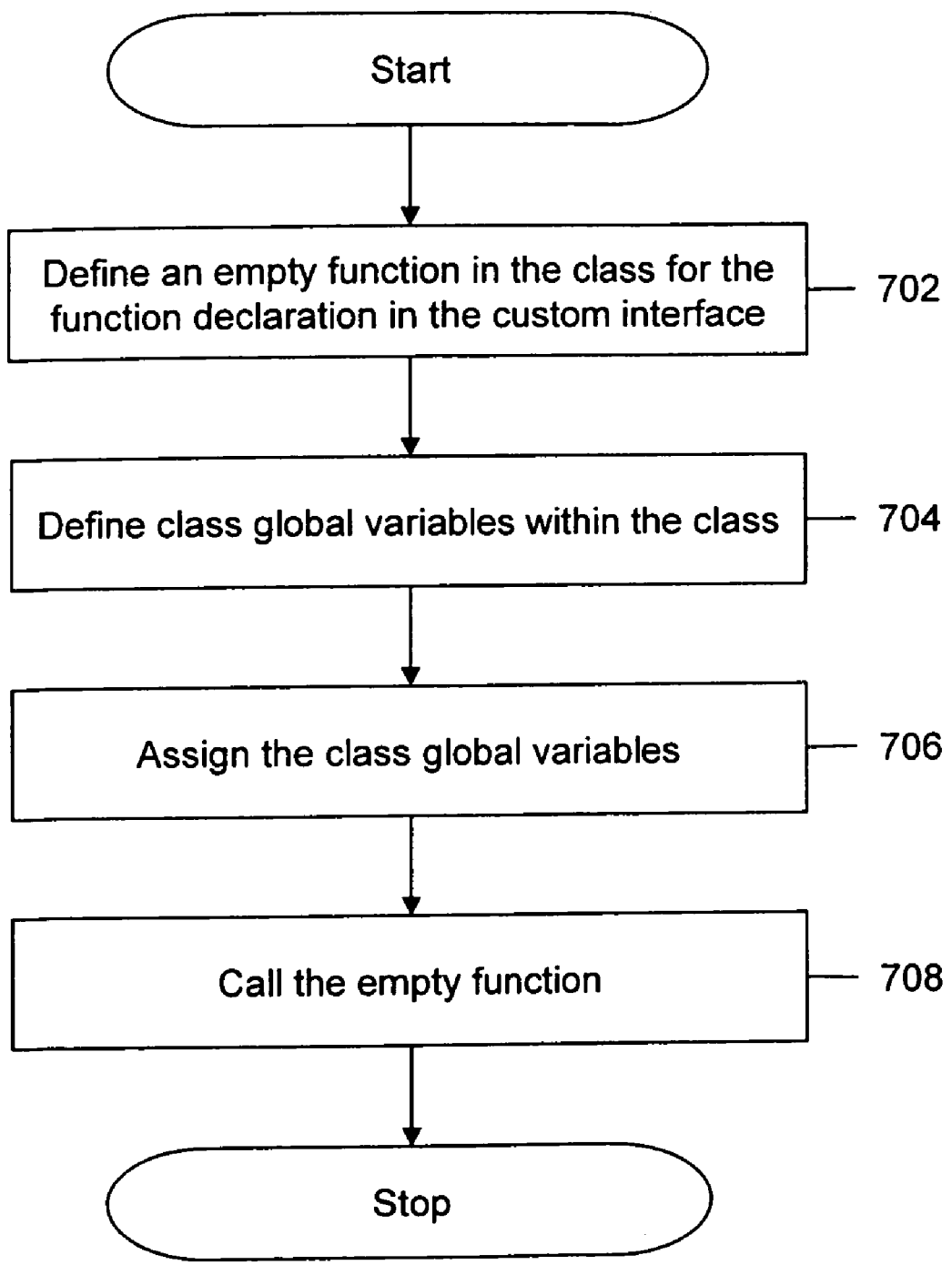
FIG. 7 is a flowchart illustrating a method for defining one or more integration points for one or more variables in the at least one class, in accordance with an embodiment of the invention.

FIG. 7 is a flowchart illustrating a method for defining one or more integration points for one or more variables in the at least one class, in accordance with an embodiment of the invention. At step 702, an empty function is defined for the function declaration, such as Function Declaration 302, in the custom interface, such as Custom Interface Module 206 that are implemented by the at least one class. Thereafter, at step 704, one or more variables are defined in the at least one class. The one or more variables are validated for input injection-related security attacks. In one embodiment, the one or more variables are global in scope. Subsequently, at step 706, the one or more variables are assigned the input values that need to be validated. Finally, at step 708, the empty function is called to invoke the one or more security routines. Invoking the security routines defines the integration point for the one or more variables in the at least one class. The details of the method for defining the one or more integration points are provided in conjunction with FIG. 4.

Figure 8:
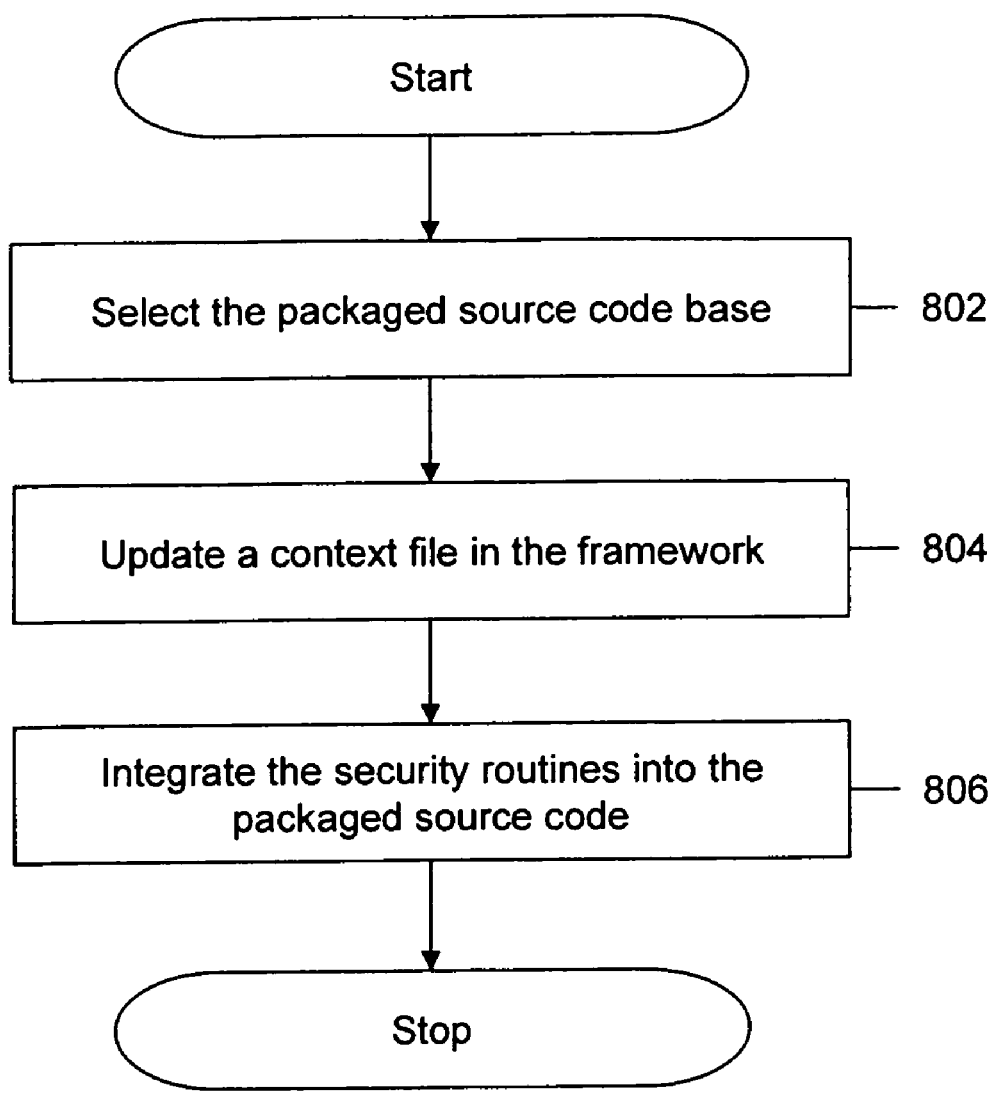
FIG. 8 is a flowchart illustrating a method for integrating the one or more security routines into a packaged source code base, in accordance with an embodiment of the invention.

FIG. 8 is a flowchart illustrating a method for integrating the one or more security routines into a packaged source code base, in accordance with an embodiment of the invention. At step 802, the packaged Source Code Base 802, is selected for the integration of one or more security routines. At step 804, a context file is updated. The context file includes context information pertaining to one or more variables in the at least one class. This context information includes the names of one or more types of security routines that need to be applied for security validation of each of the one or more variables. For example, the SQL injection security routine is applied for SQL injection-related input security attacks. Further, the context information includes the names of the functions that invoke the one or more security routines for security validation.

Subsequently, at step 806, one or more security routines are integrated into the packaged source code base, based on the one or more integration points.

The Framework 104 therefore provides context-based security validation. Further, Framework 104 integrates the security features into the source code base, without modifying the underlying source code base. Therefore, the programmer need not be a security expert to integrate the security features into the source code base.

Moreover, if a new input injection-related vulnerability is identified, the framework can be updated with the new security routines related to the vulnerability. Furthermore, the validator package module includes a rules database that can be modified to minimize false positives and negatives. The security routines can be replaced with third-party security routines. Each of the above updates mentioned above are implemented without modifying the underlying source code base.

In various embodiments of the invention, the modules of Framework 104 may be implemented in the form of software, hardware, firmware, or combinations thereof.

The computer system comprises a computer, an input device, a display unit and the Internet. The computer also comprises a microprocessor, which is connected to a communication bus. The computer also includes a memory, which may be a Random Access Memory (RAM) and Read Only Memory (ROM). Further, the computer system comprises a storage device, which can be a hard disk drive or a removable storage drive such as a floppy disk drive, an optical disk drive, etc. The storage device can also be other similar means for loading computer programs or other instructions into the computer system. The computer system includes a communication unit, which enables the computer to connect to other databases and the Internet through an I/O interface. The communication unit enables the transfer and reception of data from other databases. The communication unit may include a modem, an Ethernet card or any similar device that enables the computer system to connect to databases and networks such as LAN, MAN, WAN and the Internet. The computer system facilitates inputs from a user through an input device that is accessible to the system through an I/O interface.

The computer system executes a set of instructions that is stored in one or more storage elements, to process input data. The storage elements may hold data or other information, as desired, and may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. Processing of input data by the processing machine may be in response to users' commands, the results of previous processing, or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

The invention claimed is:

1. A processing system for implementing a framework for securing a source code base during the development phase of a software development lifecycle, the source code base comprising one or more classes, the processing system comprising:
    at least one processor;
    a memory coupled to the at least one processor, for storing an package module and a validator package module;
    wherein the processor is configured to:
    execute the package module for integrating one or more security routines into the source code base; and
    execute the validator package module for validating the at least one class based on a defined context for security validation of the at least one class;
    wherein the package module further comprises:
    i. a custom interface module comprising a function declaration, wherein the custom interface module is implemented by at least one class of the one or more classes;
    ii. a validator module comprising a controller code for controlling flow of execution based on the defined context, wherein one or more security routine integration steps are defined within the at least one class, the one or more security routine integration steps being defined by invoking an empty function for the function declaration in the custom interface; and
    wherein the validator package module comprises one or more validation classes.

2. The processing system according to claim 1, wherein the validator module comprises a context module, the context module comprising context information of one or more variables of the at least one class.

3. The processing system according to claim 2, wherein the validator module further comprising a validator configuration module, the validator configuration module comprising information of one or more validation classes, each of one or more validation classes validating the one or more variables.

4. The processing system according to claim 1, wherein the validator package module comprises a rules database for validating the one or more variables of the at least one class, the rules database comprising one or more validation rules.

5. A computer-implemented method for securing a source code base during the development phase of a software development lifecycle, the source code being secured using a framework, the source code base comprising one or more classes, the framework comprising a custom interface, the custom interface comprising a function declaration, the method comprising:
    a. implementing the custom interface for at least one class of the one or more classes in the source code base;
    b. defining, using a processor, one or more security routine integration steps within the at least one class to create a defined context for security validation of the at least one class, wherein one or more security routine integration steps are defined within the at least one class, the one or more security routine integration steps defined by invoking an empty function for the function declaration;
    c. packaging the source code base having the one or more classes;
    d. validating at least one of the one or more classes based on the defined context using one or more validation classes; and e. integrating one or more security routines into the packaged source code base using the defined context.

6. The method according to claim 5 further comprises implementing the custom interface if the at least one class requires security validation.

7. The method according to claim 5, wherein the at least one class defines an empty function for the function declaration in the custom interface.

8. The method according to claim 5, wherein defining the one or more security routine integration steps comprises defining one or more variables in the at least one class.

9. The method according to claim 6, wherein defining the one or more security routine integration steps further comprises assigning values to one or more variables in the at least one class.

10. The method according to claim 7, wherein defining the one or more security routine integration steps further comprises calling the empty function.

11. A method according to claim 5, wherein integrating the one or more security routines into the packaged source code base further comprises:
   a. selecting the packaged source code base;
   b. updating a context file in the framework, the context file comprising context information of one or more variables in the at least one class requiring security validation; and
   c. generating a binary code, wherein the binary code is generated by compiling the one or more security routines into the packaged source code base based on the defined one or more security routine integration steps, wherein the one or more security routines are integrated into the packaged source code base for the at least one class requiring security validation.

12. The method according to claim 11 further comprises invoking one or more validation classes based on the context information in the context file, wherein the one or more validation classes validates the one or more variables based on a rules database, the rules database comprising one or more validation rules.

13. The method according to claim 12, wherein the context information comprises names of the one or more security routines to be applied for security validation.

14. The method according to claim 13, wherein the context information further comprises names of the functions invoking the one or more security routines for security validation.

15. A non-transitory computer program product containing instructions that, when executed by a processor, cause the processor to perform a method for securing a source code base during the development phase of a software development lifecycle, the source code being secured using a framework, the source code base comprising one or more classes, the framework comprising a custom interface, the custom interface comprising a function declaration, the method comprising:
   a. implementing the custom interface for at least one class of the one or more classes in the source code base;
   b. defining one or more security routine integration steps within the at least one class to create a defined context for security validation of the at least one class, wherein one or more security routine integration steps are defined within the at least one class, the one or more security routine integration steps defined by invoking an empty function for the function declaration;
   c. packaging the source code base having the one or more classes;
   d. validating at least one of the one or more classes based on the defined context using one or more validation classes; and
   e. integrating one or more security routines into the packaged source code base using the defined context.

16. The computer program product according to claim 15 further comprising instructions for implementing the custom interface if the at least one class requires security validation.

17. The computer program product according to claim 16, wherein the at least one class defines an empty function for the function declaration in the custom interface.

18. The computer program product according to claim 15, wherein the instructions for defining the one or more security routine integration steps comprises instructions for defining one or more class global variables within the at least one class.

19. The computer program product according to claim 16, wherein the instructions for defining the one or more security routine integration steps further comprises instructions for assigning values to one or more class global variables.

20. The computer program product according to claim 17, wherein the instructions for defining the one or more security routine integration steps further comprises instructions for calling the empty function.

21. A computer program product according to claim 15, wherein the instructions for integrating the one or more security routines into the packaged source code base further comprises:
   a. selecting the packaged source code base;
   b. updating a context file in the framework, the context file comprising context information of one or more variables in the at least one class requiring security validation; and
   c. generating a binary code, wherein the binary code is generated by compiling the one or more security routines into the packaged source code base based on the defined one or more security routine integration steps, wherein the one or more security routines are integrated into the packaged source code base for the at least one class requiring security validation.

22. The computer program product according to claim 21 further comprising instructions for invoking one or more validation classes based on the context information in the context file, wherein the one or more validation classes validates the one or more variables based on a rules database.

23. The computer program product according to claim 22, wherein the context information comprises names of the one or more security routines to be applied for security validation.

* * * * *